US009939893B2

(12) United States Patent
Saripalle et al.

(10) Patent No.: US 9,939,893 B2
(45) Date of Patent: Apr. 10, 2018

(54) EYE GAZE TRACKING

(71) Applicant: EyeVerify Inc., Kansas City, KS (US)

(72) Inventors: Sashi Kanth Saripalle, Kansas City, KS (US); Reza Derakhshani, Shawnee, KS (US); Vikas Gottemukkula, Kansas City, KS (US)

(73) Assignee: EyeVerify Inc., Kansas City, MO (US)

( * ) Notice: Subject to any disclaimer, the term of this patent is extended or adjusted under 35 U.S.C. 154(b) by 0 days.

(21) Appl. No.: 14/631,819

(22) Filed: Feb. 25, 2015

(65) Prior Publication Data
US 2015/0241967 A1 Aug. 27, 2015

Related U.S. Application Data

(60) Provisional application No. 61/944,438, filed on Feb. 25, 2014.

(51) Int. Cl.
*G06K 9/46* (2006.01)
*G06F 3/01* (2006.01)
*G06K 9/00* (2006.01)
*G06T 7/246* (2017.01)

(52) U.S. Cl.
CPC ......... *G06F 3/013* (2013.01); *G06K 9/00597* (2013.01); *G06T 7/246* (2017.01); *G06T 2207/30041* (2013.01); *G06T 2207/30201* (2013.01)

(58) Field of Classification Search
None
See application file for complete search history.

(56) References Cited

PUBLICATIONS

Sesma et al, Evaluation of Pupil Center-Eye Corner Vector for Gaze Estimation Using a Web Cam, ETRA 2012.*
Bazanov, P., et al. (Nov. 1, 2011) "Gaze Estimation for Near-Eye Display Based on Fusion of Starburst Algorithm and FERN Natural Features", *Proceeding of the 10th Conference of Fruct Association*, pp. 16-23.
International Search Report and Written Opinion for International Patent Application No. PCT/US2015/017604, dated Jun. 11, 2015 (17 pages).
Kaya, A., et al. (Aug. 23, 2010) "Designing a Pattern Stabilization Method Using Scleral Blood Vessels for Laser Eye Surgery", *Pattern Recognition (ICPR)*, pp. 698-701.
Kim, S., et al. (Sep. 1, 2004) "An Algorithm to Detect a Center of Pupil for Extraction of Point of Gaze", *Proceedings of the 26 Annual International Conference of the IEEE*, vol. 3, pp. 1237-1240.
Zhu, J., et al. (May 20, 2002) "Subpixel Eye Gaze Tracking", *Computer Society*, Automatic Face and Gesture Recognition, pp. 131-136.

\* cited by examiner

*Primary Examiner* — Mark Roz
(74) *Attorney, Agent, or Firm* — Goodwin Procter LLP

(57) ABSTRACT

Methods and systems for eye gaze tracking are provided, in which a plurality of images of at least one eye are received and, for each image of the eye(s), a plurality of stable vascular points associated with a vasculature of the eye(s) are identified. Based on the identified stable vascular points in the received images of the eye(s), a gaze angle of the eye(s) is determined.

18 Claims, 5 Drawing Sheets

A

B

C

E    D

A – Green layer of eye
B – Extracted region of interest (ROI)
C – ROI with eyelash removal
D – Corresponding scleral region with eyelash removal
E – Sclera with eyelashes A – Green layer of eye
B – Extracted region of interest (ROI)
C – ROI with eyelash removal
D – Corresponding scleral region with eyelash removal
E – Sclera with eyelashes

EYE GAZE TRACKING

CROSS-REFERENCE TO RELATED APPLICATIONS

This application claims priority to and the benefit of U.S. Provisional Patent Application 61/944,438, filed on Feb. 25, 2014, and entitled "Eyeprint Gaze Tracking," the entirety of which is incorporated by reference herein.

BACKGROUND

The present disclosure relates generally to image analysis and, more particularly, to systems and methods for real-time eye gaze tracking.

Eye tracking refers to the process of identifying the gaze or movement of an eye. Of late, accessibility of eye tracking technology has resulted in a proliferation of its use in various fields, such as user interface control, web design, advertising, automotive engineering, and many others. Given the number of current and potential uses for eye tracking technology, improvements in the accuracy and efficiency of eye tracking techniques are critical to ensuring that eye tracking functionality can be easily incorporated into various types of devices, such as wearable and other mobile devices.

BRIEF SUMMARY

Systems and methods are described for eye gaze tracking based on the position of visible vasculature on the white region of the eye. Digital images used for the tracking can be sourced from image sensor hardware that is part of a wearable computing device or other device such as a smartphone or laptop.

In one aspect, a computer-implemented method comprises receiving a plurality of images of at least one eye; for each received image of the at least one eye, identifying a plurality of stable vascular points associated with a vasculature of the at least one eye; and determining a gaze angle of the at least one eye based on the identified stable vascular points in the received images of the at least one eye. Other embodiments of this aspect include corresponding systems and computer programs.

In one implementation, the method further includes extracting a plurality of feature descriptors around the identified stable vascular points, and creating a plurality of templates based on the feature descriptors and identified stable vascular points. The method can further include determining the gaze angle by matching one or more of the templates with one or more enrollment templates to determine the gaze angle.

In another implementation, the method further includes identifying one or more stable peri-ocular anchor points based on one or more of the received images of the eye. Determining the gaze angle can include tracking one or more of the identified stable vascular points over time; and determining the gaze angle based on a displacement of one or more of the identified stable vascular points relative to one or more of the stable peri-ocular anchor points. A particular stable peri-ocular anchor point can include a corner(s) of the eye and/or other landmarks external to the ocular globe such as the nose bridge.

In further implementations, the method includes enhancing a contrast of a white part of the eye in a particular received image of the eye, and/or removing noise (e.g., eyelashes) from a white part of the eye in a particular received image of the eye. The method can further include determining an approximate location of an iris of the eye based on a particular received image of the eye.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Distinctive features of the visible vasculature in the white of an eye can be used to track the movement of and/or determine the gaze (i.e., the point of direction) of the eye. For example, images of the whites of an individual's eye can be obtained over multiple instances of time and analyzed to identify vascular points of interest and other eye features. The movement or change in these features over time can be used to determine where the individual is looking at a particular point in time.

The visible vasculature corresponds to the vasculature seen in the white of the eye. The white of the eye has a number of layers. The sclera is a largely opaque, fibrous, protective, layer of the eye containing collagen and elastic fiber. The sclera is covered by the conjunctiva, which has a particularly large number of blood vessels and veins that that run through and over it. The episclera is covered by the bulbar conjunctiva, which is a thin clear membrane that interfaces with the eyelid or the environment when the eyelid is opened. Some of the blood vessels (vasculature, in general), especially the one in the bulbar conjunctiva and episclera, are visible and can be detected in images of the eye.

Figure 1:
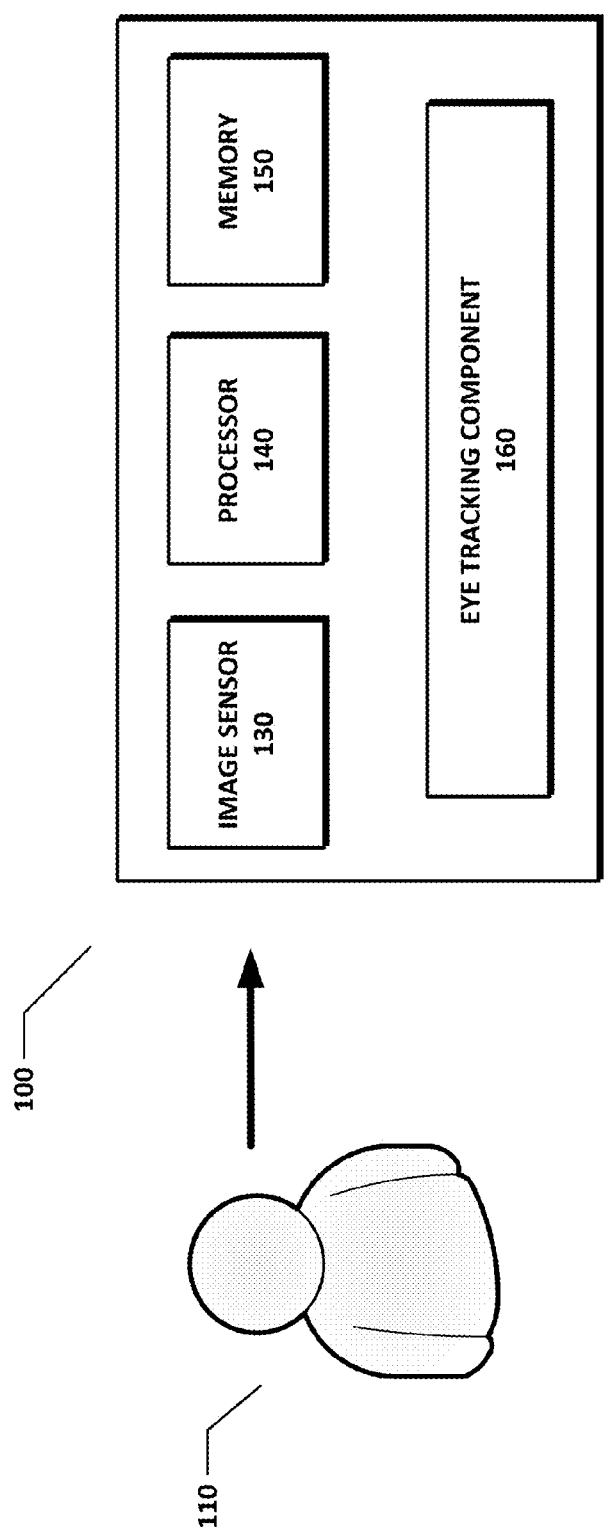
FIG. 1 is a diagram depicting an example architecture of a system for eye gaze tracking according to an implementation.

FIG. 1 illustrates one implementation of a localized system for eye gaze tracking A user device 100 includes an image sensor 130, processor 140, memory 150, eye tracking component 160, and a system bus that couples various system components, including the memory 150 to the processor 140. Eye tracking component 160 can include hardware and/or software modules that perform operations on images captured by image sensor 130. For example, eye tracking component 160 can process and analyze eye images to identify vascular points, extract feature descriptors around the interest points, create templates based on the vascular points and features, and determine eye movement based on the templates over time. Functionality provided by the eye tracking component 160 can include the various methods for gaze tracking further described below.

Images of a user's eye or eyes are captured using image sensor 130, e.g., a camera, that is associated with user device 100. User device 100 can include, for example, a wearable device and/or a mobile device. Examples of user device 100 can include, but are not limited to, a smart phone, smart watch, smart glasses, tablet computer, laptop, gaming device, palmtop, portable computer, television, personal digital assistant, wireless device, workstation, or other computing device that is operated as a general purpose computer or a special purpose hardware device that can execute the functionality described herein.

By way of illustration, the camera can be a digital camera, a three-dimensional (3D) camera, or a light field sensor. In some implementations, the camera can be an inward facing module in a wearable device with a spectacle form factor, and used to capture images of the white of the eye. In some implementations, multiple cameras at various locations on a wearable device can be used together to capture the whites of both eyes. The images can be captured either in still mode or in video mode. When the user looks to the left or right, this can expose a larger area of the white of the eye to the right or left of the iris for data capture whereas, when the user looks straight at the camera, this can provide two smaller segments of the white of the eye to the left and right of the iris in each eye. In some implementations, the acquired images are cropped to obtain RGB images of one or more eyes. Thus, as used herein, "image" or "captured image" can also refer to a cropped RGB image of an eye.

Technologies that are well-suited for identifying features based on images of the eye can be found in U.S. Pat. No. 8,369,595, issued on Feb. 5, 2013, and entitled "Texture Features for Biometric Authentication," and U.S. patent application Ser. No. 14/274,385, filed on May 9, 2014, and entitled "Feature Extraction and Matching for Biometric Authentication," the entireties of which are incorporated by reference herein. For example, an image sharpening technique can aid in efficient feature detection. A vascular point detection (VPD) technique can detect points of interest from visible vasculature of the eye, and Pattern Histograms of Extended Multi-Radii Local Binary Patterns (PH-EMR-LBP), Enhanced Multi-Radii Local Binary Patterns (EMR-LBP), Enhanced Multi-Radii Center-Symmetric Local Binary Patterns (EMR-CS-LBP), and/or Pattern Histograms of Extended Multi-Radii Center Symmetric Local Binary Patterns (PH-EMR-CS-LBP) can efficiently provide feature description of portions of images surrounding a point of interest of vasculature. The visible vasculature is enclosed in a scleral mask, which can be a binary image mask that includes white of the eye and excludes an image portion surrounding the white of the eye from an ocular image. Matching techniques can improve the efficiency and/or accuracy of distance or correlation based matching by using outlier detection. The techniques described in the incorporated references also allow for the creation, updating, and matching of templates that are derived from reference images (including, for example, enrollment and verification templates often used for biometric authentication). A particular template can include a collection of interest points such as vascular points as well as corresponding feature descriptors.

Implementations of the system described herein can use appropriate hardware or software; for example, the system can execute on hardware capable of running an operating system such as the Microsoft Windows® operating systems, the Apple OS X® operating systems, the Apple iOS® platform, the Google Android™ platform, the Linux® operating system and other variants of UNIX® operating systems, and the like. The system can include a plurality of software processing modules stored in a memory 150 and executed on a processor 140. By way of illustration, the program modules can be in the form of one or more suitable programming languages, which are converted to machine language or object code to allow the processor or processors to execute the instructions. The software can be in the form of a standalone application, implemented in a suitable programming language or framework.

Additionally or alternatively, some or all of the functionality can be performed remotely, in the cloud, or via software-as-a-service. For example, certain functions (e.g., image processing, template creation, template matching, etc.) can be performed on one or more remote servers or other devices that communicate with user device 100. The remote functionality can execute on server class computers that have sufficient memory, data storage, and processing power and that run a server class operating system (e.g., Oracle® Solaris®, GNU/Linux®, and the Microsoft® Windows® family of operating systems). Communication between servers and user devices can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
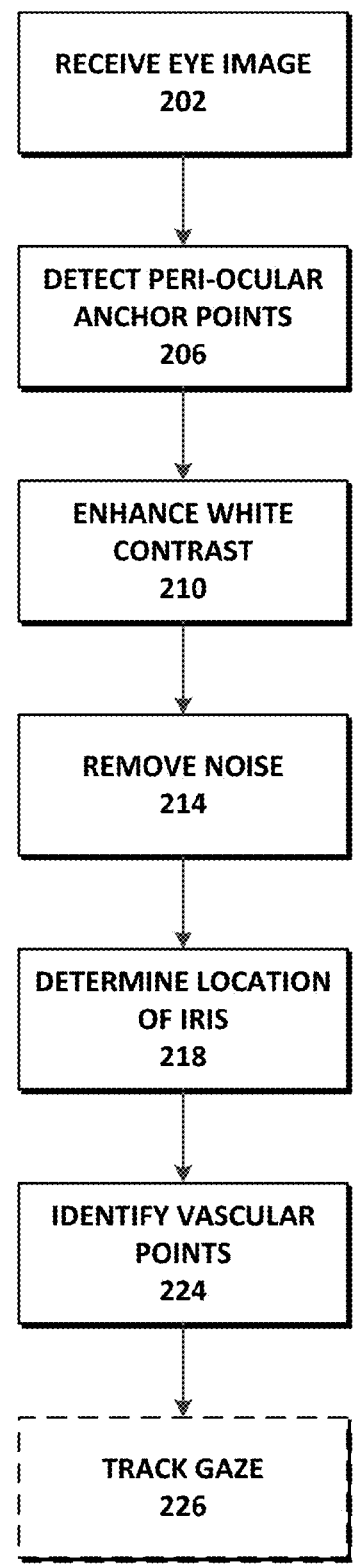
FIGS. 2-4 are flowcharts depicting example methods for eye gaze tracking according to various implementations.

FIG. 2 depicts one implementation of a method for eye gaze tracking. In STEP 202, the eye tracking component 160 receives an image of an eye. The image can be received from, for example, image sensor 130 of user device 100. The image can be colored or gray scale. In STEP 206, the eye tracking component 160 executes a computer vision algorithm to detect one or more stable peri-ocular anchor points (e.g., points on the lower eyelid, eye corners, nose bridge, etc.) to register the image. Detection of eye corners can be achieved using a template correlation or eye shape detection method, for example. Image processing algorithms can be executed to enhance the contrast of the white parts of the eye in the image (STEP 210), and to remove noise elements, such as eyelashes, from the white parts of the eye using, for example, predefined Gabor filters (STEP 214).

In STEP 218, the eye tracking component 160 calculates the vertical projections of the white parts of the eye in the image, including the iris. The vertical projections are column average of intensity pixels in either a gray scale or color image utilizing the region in the scleral and iris mask. The mask can be a binary mask excluding the iris structure pupil region and other parts of the image. The projections of the image region in the scleral and iris mask result in a single dimensional vector with a length based on the scleral mask width. Let the length of the signal be N. In one implementation, a sliding window technique is used, with the window size equal to 1/10 of the length of the single dimensional vector to calculate mean values of the vertical projections (M=m1, m2, m3, . . . , mN). The resulting signal is retained above a certain threshold, and the remainder of the mean values in the signal are suppressed. The threshold can be calculated as threshold=max(M)=range (M). A peak in the retained mean valued after thresholding provides an approximate location of the iris limbic boundary and other information such as the major and minor axes of the iris.

The limbic boundary around the iris and the center of iris itself can also be used as additional assistive points, for instance to enhance gaze angle detection when enough VPD points are not available. Extra-ocular points of reference can be garnered from peri-ocular landmarks such as eye corners or other stable structures such as skin textures under the eyelids or on the nose bridge. In one implementation, image templates from a user's peri-ocular regions of interest can be registered and stored as anchor point templates. During gaze tracking, these templates can be matched to accurately recover the locations of those extra ocular reference points in order to garner gazing information irrespective of head movements. Various methods can then be used to identify vascular interest points which latch onto visible vasculature (STEP 224) and to determine track gaze (STEP 226). For example, to identify stable and reliable vasculature points, an interest point detector such as Vascular Point Detector (VPD) or Features from Accelerated Segment Test (FAST) can be used.

Figure 3:
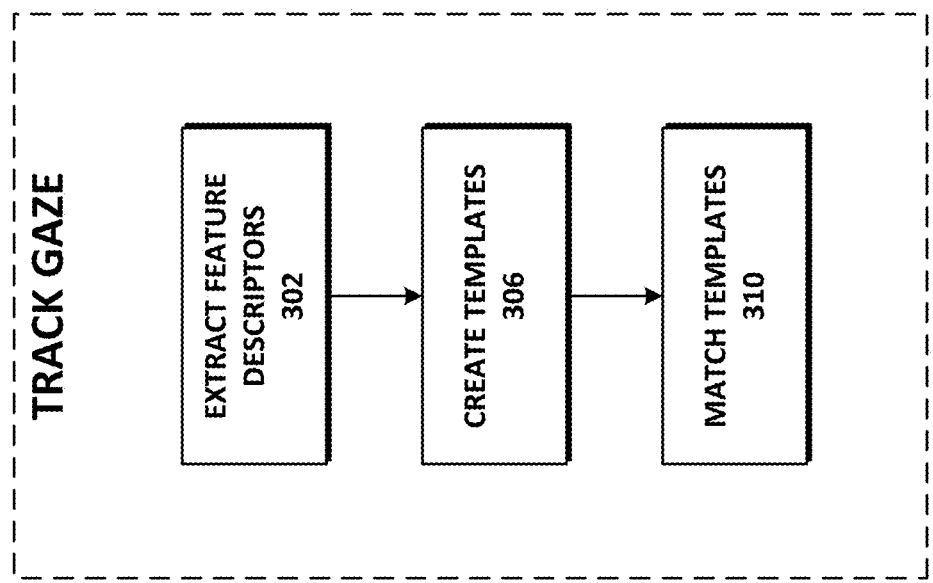

FIG. 3 depicts one implementation of determining gaze in STEP 226. The eye tracking component 160 extracts one or more feature descriptors around the detected interest points (STEP 302). In one example, the feature descriptors used are PH-EMR-LBP and/or PH-EMR-CS-LBP. These descriptors are used in consideration of the visibility of vasculature on the white of eye not being consistent and environment and sensor noise being expected. In STEP 306, one or more templates are created for each gaze, where each template includes interest point locations and corresponding local features. In an enrollment process, the user is asked to gaze in various angles, aided by visual cues. In one example, these visual cues are projected onto the lenses of a wearable device. At each gaze, the area of the visible white of eye changes, resulting in different patterns of visible vasculature. Due to the change in the information of visible vasculature, a template or multitude of templates accompanies each gaze. The created templates, alongside the earlier mentioned templates of peri-ocular reference points, can then be matched with corresponding verification templates to determine the gaze angle (STEP 310).

Figure 4:
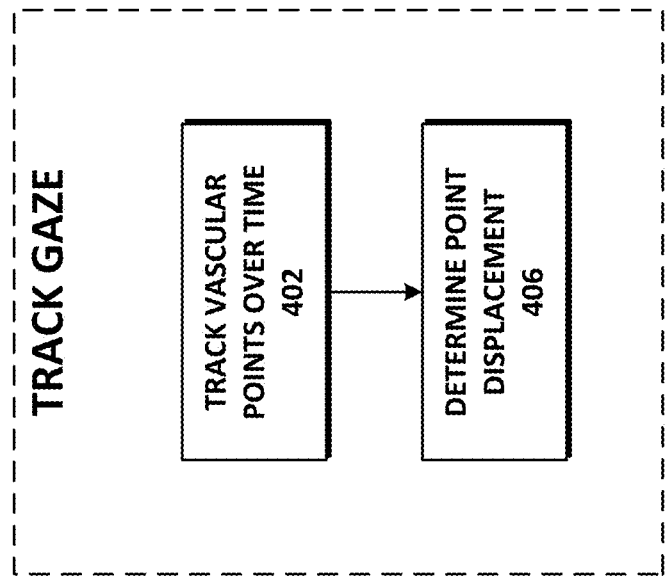

FIG. 4 depicts another implementation of determining gaze in STEP 226. The eye tracking component 160 tracks over time the stable vasculature points identified using an interest point detector (STEP 402). The vasculature points can be tracked continuously in real-time or on a periodic basis with delays in between measurements. In STEP 406, the gaze is determined based on the displacement of multiple points (optical flow) relative to the stable peri-ocular points. For example, the eye gaze can be tracking based on a measurement of relative distance and angle between a corner of the eye (anchor point) and one or more stable vasculature points, as noted above.

The corner of eye can be measured using various techniques. In one implementation, the approximate location of medial and lateral canthi (inner and outer eye corners) can be estimated using the intersection of the parabolas fitted to the upper and lower eyelid on a pre-processed image filtered by a Gabor kernel. In another implementation, the locations of inner and outer corners calculated from the aforementioned process can be improved using the following technique. While enrolling users, find (multi-scale) templates of canthi (for example, using Local Binary Patterns (LBP), oriented LBP (OLBP), PH-EMR-CS-LBP, or PH-EMR-LBP). At the time of verification, fine tune the location of anchor points derived from parabolic fitting using the canthi templates from enrollment by tuning the verification canthi loci by matching them to their enrollment templates via a multi scale sliding correlation. Other stable locations, such as the limbic boundary, iris center, nose, texture on skin, and so on, can be used in a similar fashion as anchor points. In other implementations, these anchor points can be tracked in real time using methods such as optical flow.

In one implementation, a strong vascular point can be identified using the information from the local descriptors (e.g., PH-EMR-LBP, PH-EMR-CS-LBP, Speeded Up Robust Features (SURF), LBP and Histograms of Oriented Gradients (HoG)) around identified vascular points (obtained using, e.g., FAST, VPD, etc.). In another implementation, instead of single stable points near the limbic boundary, multiple stable points from a region of interest can be used to determine the gaze based on the displacement and angle from one or more anchor points.

Example Implementation

Calibration and Data Collection

Figure 5:
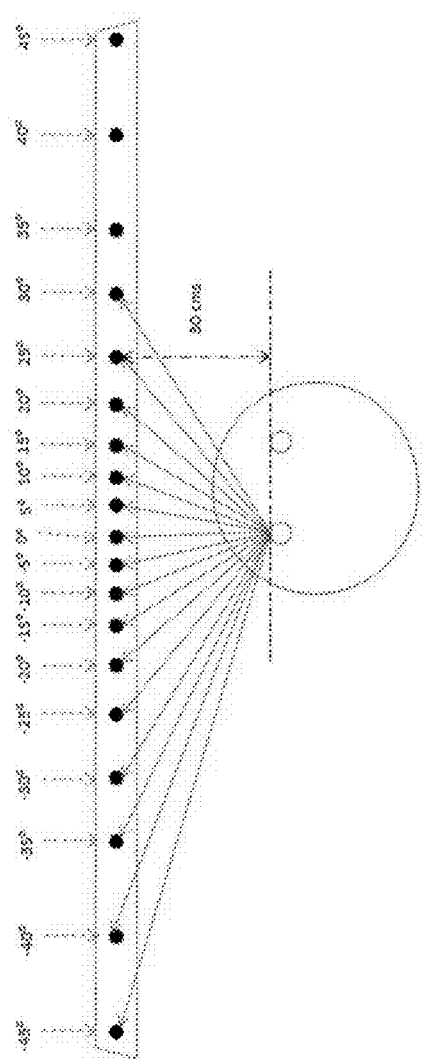
FIGS. 5-6 are diagrams depicting measured view angles of a left and right eye, respectively.
Figure 6:
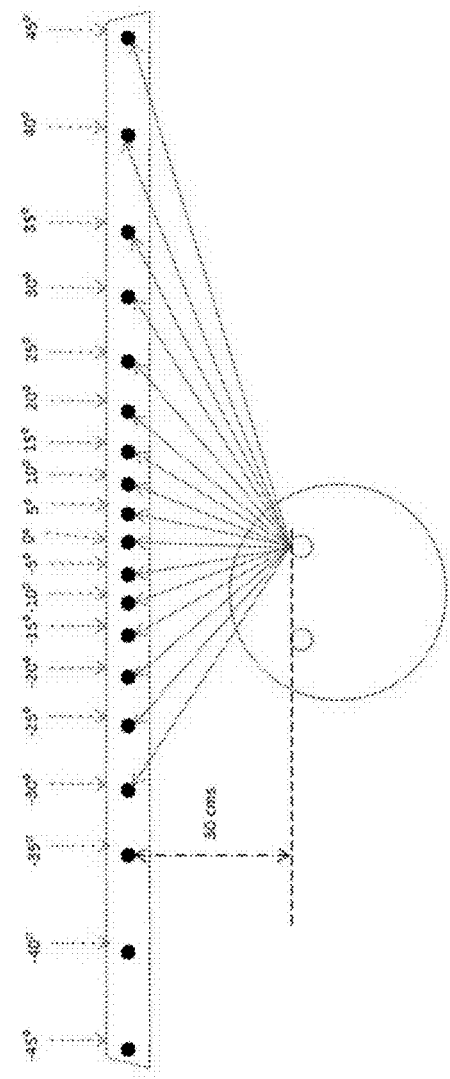

In one implementation, to calibrate the system, targets were located at 5 degree intervals from the line of sight of the eye. Subjects were asked to look at the targets using one eye at the time, keeping the other eye closed. It was observed that the range of motion for the left eye is −45 degrees to +30 degrees (see FIG. 5), and the range of motion for the right eye is −30 degree to +45 degree (see FIG. 6).

Figure 7:
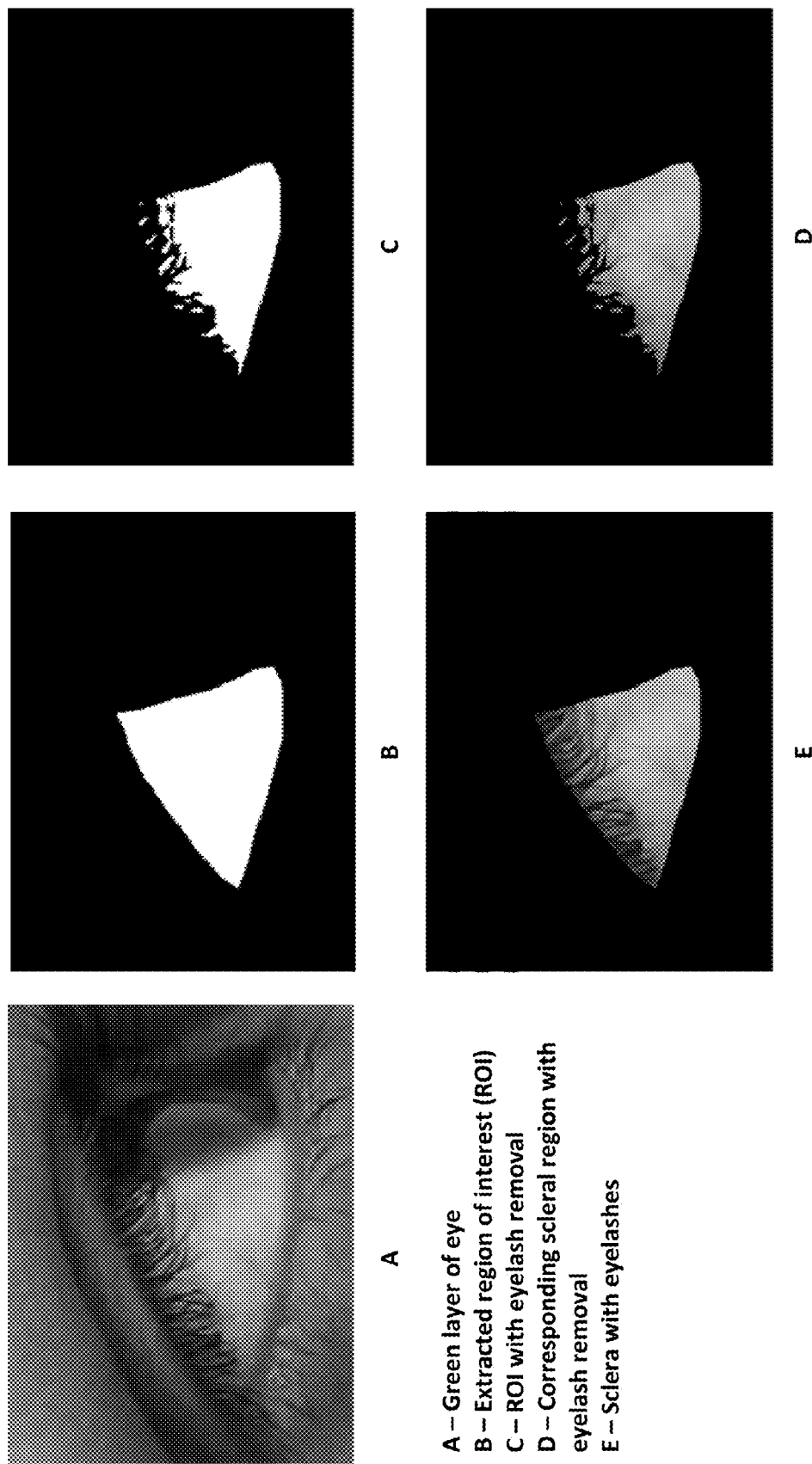
FIG. 7 depicts example results of image processing techniques performed on an image of an eye.

A rear-facing camera from an Apple® iPhone 5S, in video mode at 120 frames per second (fps), was used to collect the data (note, however, that a video camera with various resolutions in video mode at a different fps can be also used). Eye regions were manually cropped from the full frames. Alternatively, an eye cropping method using Haar or Haar-like filters can be trained to automatically detect the eye regions. A segmentation algorithm, which is based on an estimation of ellipses, was used to extract the whites of the eye (regions of interest (ROI)). As shown in FIG. 7, eyelashes were detected and removed from the extracted ROI using a Gabor-based filtering method. Even Gabor filters followed by histogram clipping was used to eliminate the noisy pixels (eye lashes) in the ROI. A set of complex Gabor filters at various orientations with an adjustable wavelength and spread in x and y directions can be used to detect line- and curve-like structures in the ROI. Further, the detected pixels can be grouped into a histogram and values above a certain threshold clipped.

Interest Point Detection and Feature Extraction

Various point detection algorithms can be used to identify salient points which potentially identify as vasculature point neighborhood within an ROI. One example is the VPD algorithm, which is an image parsing algorithm that can identify vascular structures and stable vascular points in an ROI. The SURF algorithm is another point detection algorithm that can be used to identify interest points using the determinant of a Hessian matrix. The FAST algorithm is another interest point finder that labels a pixel as "corner" point if a certain number of contiguous pixels in a predefined pixel neighborhood are brighter or darker than the center point. The Harris and Stephens (HS) algorithm is another corner detection algorithm that finds interest points by placing a small window over them and moving the window in different directions, calculating the autocorrelation in the local neighborhood. Based on eigenvalues of the aforementioned neighborhood autocorrelation matrix, an interest point is assigned to be a corner.

After interest points are identified using one or more point detection algorithms such as those described above, a set of local image descriptors is obtained from ROI localities surrounding each candidate point. These local image patch descriptors can be generated using a variety of algorithms. HoG is one such algorithm that calculates histograms of oriented Gradients. SURF builds upon Scale-invariant Feature Transform (SIFT) descriptors but with better computational efficiency using Haar wavelets and integral images. Local Binary Pattern (LBP) and Directional Local Binary Patterns (DLBP) are two other binary image feature extractors. In one implementation, Histograms of LBP (HLBP) and Histograms of DLBP (HDLBP) are used as feature descriptor algorithms, described in further detail below. Other feature descriptor algorithms, or combinations of such algorithms can be used to generate image descriptors around interest points of an ROI.

LBP descriptors can be calculated around interest points as follows. Assume that the current interest point is at pixel location (x0,y0). The intensity values of the immediate 8-neighbors of the center point (x0,y0), {(xi,yi)}, i=1, 2, . . . , 8, are compared to that of the center point and the results (0 or 1) are stored in Eventually the LBP8 (8 bit code) for (x0,y0) is given as $$LBP8 = \sum_i K_i * 2^{i-1}$$

In one implementation, the same process can be repeated for the pixels in the outer square of LBP8, creating a 16-bit (two-byte) LBP16 code for the same given interest point. Thus, one generates a total of three bytes of LBP code for each interest point. The process is repeated for a 5×5 pixel neighborhood of (x0,y0), yielding a total of 5×5=25 repetitions of the above LBP8 (one byte)+LBP16 (two bytes) calculations around the given center point, resulting in a 3×25=75 byte binary descriptor for each interest point such as (x0,y0).

As noted above, DLBP are similar to the LBP, however, the reference point for each pairwise pixel comparison is the diagonally opposite pixel in an 8 or 16 neighborhood of the center point of interest, instead of the intensity value of the center point, leading to half the number of bits compared to LBP features. Both LBP and DLBP descriptors are binary numbers.

As noted above, HoG is calculated using a neighborhood of a certain size (in pixels) defined around an interest point. That neighborhood is divided into a predefined number of sub-regions, within which histograms of edge orientations at certain angles are created and collectively used as the local descriptor for that interest point. These histogram-based descriptors are real number vectors. In one implementation, a neighborhood of size 4×4 pixels is tiled into 2×2 sub regions with histograms of orientations binned into 6, each 30 degrees apart, and used as feature descriptors. In one implementation, a neighborhood of size 4×4 pixels tiled into 3×3 sub regions with histograms of orientations binned into 6 bins (each 30 degrees apart) can be used as feature descriptors.

As noted above, HLBP descriptors, similar to HoG, are calculated using a neighborhood of a certain size (in pixels) around the interest point. That neighborhood is divided into a predefined number of sub-regions, within which LBP codes are created per above. Next, to create histograms, counts for occurrence of each bit location are generated. The concatenations of these histograms of LBP codes create HLBP features. These descriptors are real number vectors. A neighborhood of size m×m (m=4, 5, . . . , 11) pixels is tiled into n×n (n=2, 3, . . . , 7) overlapping sub regions (tiles), with histograms of occurrence of each LBP bit location used as feature descriptors.

In one implementation, a neighborhood of size 9×9 pixels (whose LBP8 and LBP16 codes are already generated) is tiled into sixteen 3×3 sub regions, each with one pixel overlap. The string of each sub-region of LBP8 and LBP16 is converted to unsigned 8-bit numbers of length 9. These unsigned 8-bit numbers are converted to an unsigned 16-bit number string and further histograms of occurrence of each bit location are calculated (delivers vector of length 16 bit). Finally, each sub-region will have two vectors of length 16 from LBP8 and LBP16 that are concatenated to deliver a final HLBP length of 512 using 16 sub-regions.

PH-EMR-LBP descriptors are calculated using a neighborhood of a certain size (in pixels) around the interest point. For each pixel in the neighborhood, LBP is calculated over multiple radii such as in 3×3 and 5×5 blocks and concatenated to obtain a single feature (EMR-LBP). The defined neighborhood is further divided into overlapping sub regions. Counts for the occurrence of each bit location within a sub-region are calculated to generate a histogram. The concatenation of these histograms of EMR-LBP codes across all the sub-regions is defined as a PH-EMR-LBP feature.

PH-EMR-CS-LBP is calculated in a fixed neighbor around an interest point. Initially, in this implementation, the reference point for each pairwise pixel comparison includes the diagonally opposite pixel in an 8-pixel or 16-pixel neighborhood of the center point of interest, instead of the intensity value of the center point, thereby leading to half the number of bits compared to EMR-LBP features (EMR-CS-LBP). Next, the defined neighborhood is divided into a predefined number of overlapping sub regions. The counts for occurrence of each bit location within a sub-region are generated. The concatenations of these histograms of EMR-CS-LBP codes can provide the PH-EMR-CS-LBP features.

In some implementations, feature descriptors for the image patch around an interest point can be derived from a single feature descriptor algorithm, or a plurality of different feature descriptor algorithms as described above. In other implementations, feature descriptors can be derived around candidate points at multiple image scales (multi-scale feature extraction). For example, one may detect interest points and their corresponding local image descriptors using a three stage Gaussian image pyramid.

Template Matching

Template matching is the process of finding similarity between (one or more) saved enrollment template(s) for a user against (one or more) verification template(s). If the similarity of a verification template against an enrollment template (expressed as match score) exceeds a threshold, the verification is a success; otherwise, the verification fails. Hamming distance (lower is better) is calculated for binary descriptors (Fast Retina Keypoint (FREAK), DLBP, LBP) in order to find the best matched point pairs between enrollment and verification templates. For real valued descriptor vectors, Euclidean, Manhattan, correlation, or Mahalanobis distance between SURF, HoG, PH-EMR-LBP, and/or PH-EMR-CS-LBP descriptors of an enrollment template can be compared to the respective SURF, HoG, PH-EMR-LBP, and/or PH-EMR-CS-LBP descriptors of the verification template to determine if they satisfy a given threshold. Other distance measures are contemplated. Gaze can then be determined based on the highest match score obtained against templates stored for some or all gaze directions.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
directing a user to gaze in a plurality of defined angles;
receiving during a first time period, for each angle in the plurality of defined angles, at least one image of at least one eye of the user gazing in the angle;
creating, for each angle in the plurality of defined angles and based on the at least one image of the at least one eye of the user gazing in the angle, at least one enrollment template comprising eye vascular interest point locations and corresponding local features;
receiving during a second, later time period at least one image of at least one eye of the user;
identifying, for the at least one image of the at least one eye received during the second, later time period, a plurality of stable vascular points associated with a vasculature of the at least one eye;
creating at least one verification template based on the stable vascular points identified in the at least one image received during the second, later time period; and
determining a gaze angle of the at least one eye based on matching the at least one verification template to at least one of the enrollment templates.

2. The method of claim 1, further comprising:
extracting a plurality of feature descriptors around the identified stable vascular points wherein creating the at least one verification template comprises creating a plurality of templates based on the feature descriptors and identified stable vascular points.

3. The method of claim 1, further comprising identifying one or more stable peri-ocular anchor points based on one or more of the received images of the at least one eye.

4. The method of claim 3, further comprising:
tracking one or more of the identified stable vascular points over time; and
determining a gaze angle of the at least one eye based on a displacement of one or more of the identified stable vascular points relative to one or more of the stable peri-ocular anchor points.

5. The method of claim 4, wherein a particular stable peri-ocular anchor point comprises a corner of the at least one eye.

6. The method of claim 4, wherein the identified stable vascular points comprises stable vascular points on a left eye and a right eye, and wherein the stable peri-ocular anchor points comprise stable peri-ocular anchor points relative to the left eye and the right eye.

7. The method of claim 1, further comprising:
enhancing a contrast of a white part of the at least one eye in a particular received image of the at least one eye; and removing noise from a white part of the at least one eye in a particular received image of the at least one eye.

8. The method of claim 7, wherein the noise comprises an eyelash.

9. The method of claim 1, further comprising determining an approximate location of an iris of the at least one eye based on a particular received image of the at least one eye.

10. A system comprising:
one or more computers programmed to perform operations comprising:
   directing a user to gaze in a plurality of defined angles;
   receiving during a first time period, for each angle in the plurality of defined angles, at least one image of at least one eye of the user gazing in the angle;
   creating, for each angle in the plurality of defined angles and based on the at least one image of the at least one eye of the user gazing in the angle, at least one enrollment template comprising eye vascular interest point locations and corresponding local features;
   receiving during a second, later time period at least one image of at least one eye of the user;
   identifying, for the at least one image of the at least one eye received during the second, later time period, a plurality of stable vascular points associated with a vasculature of the at least one eye;
   creating at least one verification template based on the stable vascular points identified in the at least one image received during the second, later time period; and
   determining a gaze angle of the at least one eye based on matching the at least one verification template to at least one of the enrollment templates.

11. The system of claim 10, wherein the operations further comprise:
   extracting a plurality of feature descriptors around the identified stable vascular points wherein creating the at least one verification template comprises creating a plurality of templates based on the feature descriptors and identified stable vascular points.

12. The system of claim 10, wherein the operations further comprise identifying one or more stable peri-ocular anchor points based on one or more of the received images of the at least one eye.

13. The system of claim 12, wherein the operations further comprise:
   tracking one or more of the identified stable vascular points over time; and
   determining a gaze angle of the at least one eye based on a displacement of one or more of the identified stable vascular points relative to one or more of the stable peri-ocular anchor points.

14. The system of claim 13, wherein a particular stable peri-ocular anchor point comprises a corner of the at least one eye.

15. The system of claim 13, wherein the identified stable vascular points comprises stable vascular points on a left eye and a right eye, and wherein the stable peri-ocular anchor points comprise stable peri-ocular anchor points relative to the left eye and the right eye.

16. The system of claim 10, wherein the operations further comprise:
   enhancing a contrast of a white part of the at least one eye in a particular received image of the at least one eye; and
   removing noise from a white part of the at least one eye in a particular received image of the at least one eye.

17. The system of claim 16, wherein the noise comprises an eyelash.

18. The system of claim 10, wherein the operations further comprise determining an approximate location of an iris of the at least one eye based on a particular received image of the at least one eye.

* * * * *